US012801004B2

(12) United States Patent
Lyubarsky

(10) Patent No.: US 12,801,004 B2
(45) Date of Patent: Nov. 17, 2026

(54) SYSTEM AND METHOD FOR OPTICAL ARCHITECTURE

(71) Applicant: TEXAS INSTRUMENTS INCORPORATED, Dallas, TX (US)

(72) Inventor: Alexander Lyubarsky, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 312 days.

(21) Appl. No.: 18/428,607

(22) Filed: Jan. 31, 2024

(65) Prior Publication Data

US 2025/0044675 A1 Feb. 6, 2025

Related U.S. Application Data

(60) Provisional application No. 63/517,315, filed on Aug. 2, 2023.

(51) Int. Cl.
*G03B 21/20* (2006.01)
*G03B 33/08* (2006.01)

(52) U.S. Cl.
CPC ..... *G03B 21/2073* (2013.01); *G03B 21/2066* (2013.01); *G03B 21/208* (2013.01); *G03B 33/08* (2013.01)

(58) Field of Classification Search
CPC .. G03B 21/005; G03B 21/006; G03B 21/008; G03B 21/28; G03B 21/204; G03B 21/208; G03B 21/2013; G03B 21/2033; G03B 21/2053; G03B 21/2066; G03B 21/2073; G03B 33/04; G03B 33/08; G03B 33/12
See application file for complete search history.

(56) References Cited

U.S. PATENT DOCUMENTS

| | | | | |
|---|---|---|---|---|
| 2012/0068630 A1 | | 3/2012 | Li et al. | |
| 2016/0187644 A1* | | 6/2016 | Bhakta | F21V 7/28 359/292 |
| 2018/0239233 A1* | | 8/2018 | Kado | G03B 21/204 |
| 2019/0041739 A1* | | 2/2019 | Kamijima | G03B 21/20 |
| 2022/0100074 A1* | | 3/2022 | Yasui | G03B 21/204 |
| 2022/0121094 A1* | | 4/2022 | Liu | G02B 27/141 |
| 2022/0197126 A1* | | 6/2022 | Hu | G03B 21/208 |
| 2022/0308430 A1* | | 9/2022 | Nakamura | G03B 21/2066 |
| 2022/0334458 A1* | | 10/2022 | Lin | G02B 27/1053 |

* cited by examiner

*Primary Examiner* — Sultan Chowdhury
(74) *Attorney, Agent, or Firm* — Michael T. Gabrik; Charles F. Koch

(57) ABSTRACT

In an example, a system includes a light splitter configured to reflect first light having a first wavelength and a first polarization, to transmit light having the first wavelength and a second polarization, to transmit light having a second wavelength, and to transmit light having a third wavelength. The system also includes a quarter wave plate optically coupled to the light splitter. The system includes a color wheel optically coupled to the quarter wave plate, the color wheel having a first filter segment, a second filter segment, and a third filter segment. The system also includes a phosphor optically coupled to the color wheel, the phosphor configured to produce second light responsive to receiving the first light, and the color wheel configured to receive the second light and produce light having the second wavelength or the third wavelength.

20 Claims, 13 Drawing Sheets

SYSTEM AND METHOD FOR OPTICAL ARCHITECTURE

CROSS-REFERENCE TO RELATED APPLICATIONS

The present application claims priority to U.S. Provisional Patent Application No. 63/517,315, which was filed Aug. 2, 2023, is titled "COST REDUCED COMPACT OPTICAL ARCHITECTURE FOR PROJECTION APPLICATIONS," and is hereby incorporated herein by reference in its entirety.

BACKGROUND

Projection-based displays project images onto surfaces, such as onto a wall or a screen, to present video or still pictures. Such displays can include cathode-ray tube (CRT) displays, liquid crystal displays (LCDs), and spatial light modulator (SLM) displays, etc.

SUMMARY

In accordance with at least one example of the description, a system includes a light splitter configured to reflect first light having a first wavelength and a first polarization, to transmit light having the first wavelength and a second polarization, to transmit light having a second wavelength, and to transmit light having a third wavelength. The system also includes a quarter wave plate optically coupled to the light splitter. The system includes a color wheel optically coupled to the quarter wave plate, the color wheel having a first filter segment, a second filter segment, and a third filter segment. The system also includes a phosphor optically coupled to the color wheel, the phosphor configured to produce second light responsive to receiving the first light, and the color wheel configured to receive the second light and produce light having the second wavelength or the third wavelength.

In accordance with at least one example of the description, a system includes a light splitter. The system includes a color wheel optically coupled to the light splitter, the color wheel having a first filter segment, a second filter segment, and a third filter segment. The system also includes a homogenizing element optically coupled to the color wheel. The system includes a phosphor optically coupled to the homogenizing element. The system also includes a quarter wave plate optically coupled between the light splitter and the color wheel. The system includes a spatial light modulator optically coupled to the light splitter.

In accordance with at least one example of the description, a system includes a light splitter configured to receive first light having a first color and to reflect the first light to produce reflected first light. The system also includes a homogenizing element optically coupled to the light splitter and configured to homogenize the reflected first light to produce first homogenized light. The system includes a color wheel optically coupled to the homogenizing element, the color wheel having a first filter segment configured to reflect the first light and a second filter segment configured to transmit the first light. The system includes a phosphor optically coupled to the color wheel, the phosphor configured to produce second light responsive to receiving the first light, the second light having a second color, where the second filter segment of the color wheel is configured to filter the second light to produce third light having a third color, and the light splitter is configured to transmit the third light having the third color.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
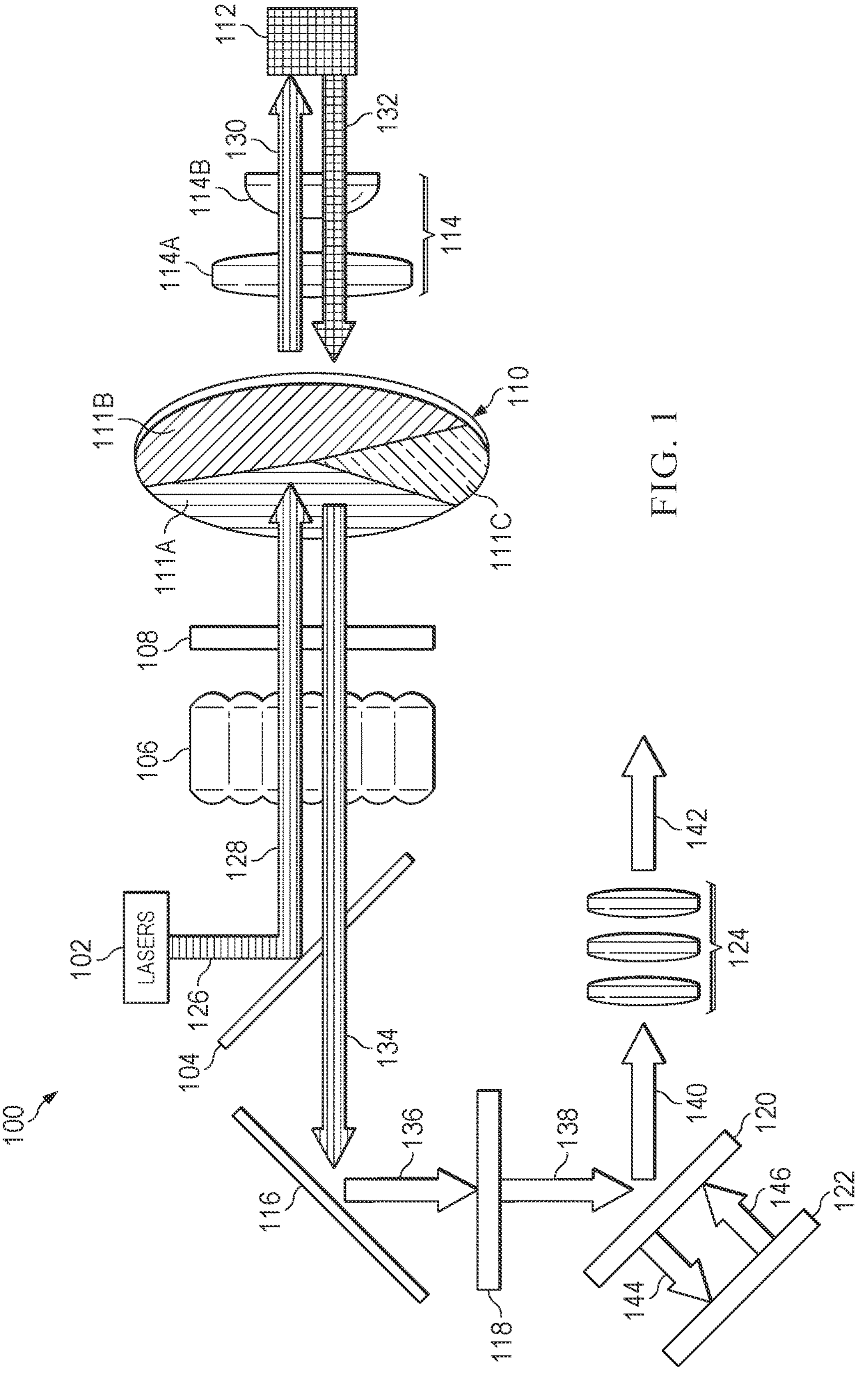
FIG. 1 is a projection system in accordance with various examples.

Some projection-based display systems or projectors have simple architectures and inexpensive components to provide low-cost systems for home, recreational, or outdoor use. These inexpensive systems often produce less than 1,000 lumens of brightness. Some low-cost systems have light emitting diode (LED) architectures that include a number of optical components, such as a prism and a number of projection lenses, that increase the cost of the system. Some LED systems, particularly those with a smaller SLM, may also have difficulty producing more than about 500 lumens of brightness.

A projection-based display system can include an SLM device that includes optical elements, such as mirrors or apertures, to generate an image. An SLM modulates the intensity of the light projected on the display by controlling the optical elements to manipulate the light and form the pixels of an image. Any type of SLM may be useful in the examples herein. The SLM may be a digital micromirror device (DMD) in which the optical elements are tilting micromirrors in one example. Each micromirror projects a pixel of the image to be displayed. The micromirrors are tilted by applying voltages to the micromirrors to project dark, bright, or shades of light per pixel. Other examples of SLMs include liquid crystal on silicon (LCOS) devices, ferroelectric liquid crystal on silicon (FLCoS) devices, and liquid crystal displays (LCDs). An LCOS device includes an array of liquid crystals on a reflective layer, which form the optical elements or pixels that are controlled to reflect and modulate the intensity of light. An FLCOS device includes ferroelectric liquid crystals that changes voltage faster than other liquid crystals. This causes faster light modulation in the FLCOS devices in comparison to LCOS devices. The optical elements or pixels of an LCD are formed of a transmissive array of liquid crystals that can be controlled, by voltage, to modulate light transmitted through the LCD.

Some architectures have separate red (R), green (G), and blue (B) LEDs to excite the SLM. Each LED has one to three collimating lenses and one or more dichroic filters, which filter certain wavelengths of light. Also included in some architectures is a fly's eye array, which is a homogenizer that makes the light uniform. The architectures may also include several illumination lenses, a prism, and an SLM. The red, green, and blue LEDs turn on for part of the frame sequentially to create white light. Light reflects off the SLM, through the prism, and then to the projection lens. These systems may include over 20 lenses, which can be costly to manufacture. These systems may also be limited to about 500 lumens.

To increase brightness, laser phosphor systems may be useful. A laser module emits laser light onto a phosphor to produce yellow or white light. In a single panel, field sequential color based system, the yellow or white light is converted to red, green, or blue light by a color wheel. In a 3LCD system, three panels (one each for red, green, and blue) split up the light using stationary dichroic filters. Laser phosphor systems often use telecentric architectures, which means that the pupil of the illumination is at infinity. Therefore, telecentric projection lenses that match the panel size and prism distances are compatible. A stronger laser can produce higher brightness, but the stronger laser can heat up and damage the phosphor. Therefore, cooling is often useful in these systems, such as fins or cooling fans. However, fins or cooling fans also increase the cost of the system.

In examples herein, projector architectures are described that include a laser phosphor and non-telecentric optics. Telecentric optics are designed to have a constant magnification regardless of the object's distance or location in the field of view. Non-telecentric optics exhibit varying magnification for objects at different distances from the lens. Non-telecentric optics eliminate the need for a prism and certain expensive projection optics, which reduces the cost of the system. The laser phosphor system may produce 500-1,000 lumens in some examples, providing greater brightness than LED architectures. In one example, a dual-pass fly's eye array homogenizes the light, and a quarter wave (24) plate rotates the polarization of blue light from the laser module. The laser provides blue light, and a phosphor produces white or yellow light, which is filtered to provide red or green light by a color wheel. The red, green, and blue light is provided to an SLM and then projected through projection lenses to produce an image. In another example, a light tunnel optically coupled to the phosphor homogenizes the light rather than using a fly's eye array. The examples herein may include a static phosphor or a moving phosphor wheel. The examples may have a yellow or a white phosphor.

The examples herein provide compact projection systems at reduced cost with high brightness. Common lasers, color wheels, and projection optics may be useful in some examples. The lack of a prism and fewer projection lenses reduces the cost and complexity of the systems described herein. Scalable brightness is attainable by using the same optics but with more or fewer lasers. Some examples have higher contrast capability due to slower F/# optics, such as F/2.0 or F/2.4. Placing a color wheel in front of a light tunnel, as shown in some examples, puts the color wheel where the light spot is small and thus a smaller color wheel may be used. Placing the color wheel by the fly's eye array may use a larger color wheel. However, some large color wheels are lower cost than smaller wheels due to their use in high volume mainstream projectors and others. In some examples, a 50 mm color wheel is used, but the projector is compact due to the small size of the other components. In an alternative example, the color wheel may be directly in front of the phosphor. With a static phosphor and a reflective blue segment on the color wheel, 100% of the blue light from the laser light source is utilized.

FIG. 1 is a projection system 100 in accordance with various examples herein. Projection system 100 includes lasers 102 (e.g., a laser module, light emitting device, or light emitting element), a light splitter 104 (e.g., a dichroic mirror/polarizer, which may also be referred to herein as a light splitting element), lens array 106, quarter wave (λ/4) plate 108, color wheel 110, phosphor 112, and collimators 114. Any number of collimators may be present, and two are shown in this example (114A and 114B). Color wheel 110 includes first color segment 111A, second color segment 111B, and reflective segment 111C in this example. In one example, the first color segment 111A is red and the second color segment 111B is green. Segments 111A, 111B, and 111C are filter segments (e.g., a first filter segment, second filter segment, and third filter segment) that may be any suitable size, and may be different sizes in some examples. In other examples, secondary color segments may be added, such as yellow, cyan, magenta, or white. These secondary color segments may boost brightness in some examples. In some examples, reflective segment 111C is smaller than segments 111A and 111B. Larger segments 111A and 111B may produce higher brightness images. Color wheel 110 may have multiple segments of each color. As an example, each segment 111A, 111B, and 111C could be split into two non-contiguous segments of color wheel 110 (e.g., color wheel 110 could have six segments, two for red, two for green, and two reflective). Projection system 100 also includes mirror 116, illumination optics 118, actuator 120, SLM 122, and projection optics 124. Illumination optics 118 and projection optics 124 may each include any number of lenses in examples herein. Actuator 120 is useful in pixel shifting systems to increase resolution more than the native panel resolution, but may be absent in other examples. Projection system 100 includes various light paths or optical paths, such as paths 126, 128, 130, 132, 134, 136, 138, 140, and 142. The components in projection system 100 are not shown to scale in FIG. 1, and may have other configurations in other examples. Some components may be absent in other examples, and components not shown here may be present in other examples.

In projection system 100, light splitter 104 is positioned to receive laser light from lasers 102 along the path 126, which may be blue laser light. Light splitter 104 may receive the laser light at a 45° angle of incidence. The light splitter 104 reflects the light receives from the path 126 to the path 128 to produce reflected light or reflected first light. A lens array 106 and quarter wave plate 108 are situated along the path 128 between light splitter 104 and color wheel 110 in this example. Collimators are situated between color wheel 110 and phosphor 112 in this example. Mirror 116 is positioned to receive light transmitted through light splitter 104 along the path 134 and reflect that light along the path 136 towards illumination optics 118. Mirror 116 may be a fold mirror in one example. A fold mirror is useful for compactness, but other types of mirrors may be used in other examples. In another example, light splitter 104 performs both splitting and folding, and mirror 116 is absent. After the illumination optics 118, the light proceeds along the path 138 towards the actuator 120. In some examples, the actuator 120 is not present. The light is then received at actuator 120. The light proceeds along path 144 to SLM 122. SLM 122 directs the light along path 146 back towards actuator 120. The light proceeds from the actuator 120 to projection optics 124 along path 140. SLM 122 projects the image to be displayed through projection optics 124, along the path 142. In other examples, the angles and positioning of components such as light splitter 104, mirror 116, and SLM 122 may be different than that shown in FIG. 1.

Projection system 100 includes components configured to provide blue laser light to a phosphor 112 to produce a different color (e.g., yellow light from a yellow phosphor in this example, or a white phosphor in other examples). The color wheel 110 produces red or green light from the yellow light provided by phosphor 112, and reflects blue light. Mirror 116 and illumination optics 118 provide red, green, and blue light to SLM 122. SLM 122 produces an image and provides the image to projection optics 124 for projection onto a screen or display.

Phosphor 112 may be a static phosphor or a phosphor wheel in examples herein. Collimated lenses may be situated between the phosphor wheel and color wheel 110. A phosphor wheel may have a continuous loop of phosphor on the face of the wheel. The phosphor wheel may spin using the same motor as color wheel 110 (described below). The spinning of the phosphor wheel may provide some cooling of the phosphor wheel. Cooling of the phosphor allows more light to be provided to the phosphor without creating thermal problems or overheating of the phosphor.

Some examples herein may have a white phosphor rather than a yellow phosphor. Many of the components of projection system 100 operates as described herein if a white phosphor is used. With a white phosphor, color wheel 110 does not have a reflective segment 111C to reflect blue light. Instead, color wheel 110 has a first color segment 111A, a second color segment 111B, and a third color segment 111C (not shown in FIG. 1). Each of the three segments is transmissive of blue light. Color wheel 110 transmits the blue light from lasers 102 to the white phosphor along path 130. A white phosphor converts most of the blue energy (e.g., 92%) from the laser light to yellow light, and the rest gets reflected as blue light. The combination of yellow and blue light creates white light. Color wheel 110 receives the white light from the white phosphor and converts the white light to red, green, or blue light with the appropriate color segment (111A, 111B, or 111C) of color wheel 110.

In some examples, the reflective segment 111C of color wheel 110 may have a diffuser mounted to it. The diffuser spreads the laser light and produces more uniform and homogenized light to illuminate the SLM 122. Lens array 106 also provides this diffusion function, but better diffusion may be achieved in some examples with the diffuser on reflective segment 111C.

In one example operation, lasers 102 produce blue laser light and provide or direct the blue laser light towards light splitter 104 along path 126. Light splitter 104 is a dichroic mirror/polarizer in one example. A dichroic mirror/polarizer transmits certain wavelengths of light and reflects certain wavelengths of light. The dichroic mirror/polarizer also transmits a certain polarization and reflects a certain polarization. Light splitter 104 is configured to reflect blue light from lasers 102 along path 128 and pass other colors of light, such as red and green light. In this example, S (perpendicular) and P (parallel) polarized light interact differently with the surface of light splitter 104. Therefore, light splitter 104 reflects a first polarization of light (S polarized or P polarized) and transmits a second polarization of light (the other one of S polarized and P polarized). As described below, light splitter 104 can reflect blue light from lasers 102 and also transmit blue light that is reflected by color wheel 110, due to the polarization of the blue light provided by quarter wave plate 108.

Light splitter 104 reflects the blue light from lasers 102 towards lens array 106 along path 128. Lens array 106, along the path 128, may be a fly's eye array in one example. Lens array 106 is configured to homogenize the blue light to produce homogenized light or first homogenized light, and may be referred to as a homogenizing element herein. The homogenized blue light then continues on path 128 towards quarter wave plate 108. Quarter wave plate 108, along the path 128, rotates the polarization of the homogenized blue light by 90 degrees. Then, the blue light continues toward color wheel 110.

The orientation of color wheel 110 determines whether the blue light is reflected or whether it is transmitted towards phosphor 112. The color wheel 110 spins to the proper orientation for either reflecting blue light or transmitting the blue light towards phosphor 112. If the blue light along path 128 strikes the first color segment 111A or the second color segment 111B of color wheel 110, the blue light passes through the color wheel to phosphor 112 along path 130. If phosphor 112 is a yellow phosphor, phosphor 112 converts the blue light to yellow light. If phosphor 112 is a white phosphor, phosphor 112 converts the blue light to white light. As shown in FIG. 1, path 130 may include one or more collimators 114 along the path 130. Collimators 114 may narrow or focus the beam of light onto phosphor 112. Phosphor 112 may be a static phosphor or a phosphor wheel in some examples. A static phosphor may be simpler to implement and/or cheaper in some examples. A phosphor wheel may provide cooling for the phosphor if the phosphor is configured to spin along with color wheel 110, as described below.

After phosphor 112 converts the blue light to yellow light, the yellow light travels along path 132 back to color wheel 110. Color wheel 110 filters the yellow light to produce another color with the first color segment 111A or the second color segment 111B. In one example, first color segment 111A produces red light and second color segment 111B produces green light. The red or green light then travels along path 134, through the quarter wave plate 108 and lens array 106 for the second time, and through light splitter 104. Quarter wave plate 108 rotates the polarization of the light, and lens array 106 homogenizes the light. Light splitter 104 is configured to transmit red and green light. Therefore, the color wheel 110 creates red or green light by filtering the yellow light from phosphor 112 with the appropriate segment of the color wheel 110.

For blue light, the blue light from lasers 102 travels along path 128, passing through the lens array 106 and the quarter wave plate 108, and strikes the reflective segment of color wheel 110 (e.g., segment 111C). The reflective segment 111C is configured to reflect blue light. The blue light is reflected by reflective segment 111C and travels along path 134. Therefore, when the orientation of the color wheel 110 is such that the light along path 128 strikes the reflective segment 111C, the light does not reach phosphor 112. After the blue light is reflected by reflective segment 111C, the blue light passes quarter wave plate 108 again and is rotated another 90 degrees. At this point, the blue light has been rotated 180 degrees total. The blue light then passes through lens array 106, which further homogenizes the light. Light splitter 104 receives the blue light and transmits the blue light this time, rather than reflecting the blue light, even though the light is at the same wavelength in both instances. Light splitter 104 has different properties for the S polarized light and the P polarized light. The 180 degree polarization of the blue light by quarter wave plate 108 allows the blue light traveling along path 134 to be transmitted by light splitter 104. Therefore, red, green, and blue light travels along path 134 to the rest of projection system 100.

After the red, green, or blue light passes through light splitter 104, mirror 116 reflects the light towards path 136. The light travels along path 136 to illumination optics 118. In one example, illumination optics 118 uses a single illumination lens. Because this example projection system 100 is non-telecentric, a single lens may be used for illumination optics 118, and no prism is used. Illumination optics 118 and projection optics 124 are therefore a non-telecentric optical path in one example. Other components in projection system 100 may also be described as residing in a non-telecentric optical path. After the light passes through illumination optics 118, the light travels along path 138 to actuator 120 and SLM 122. The light is received at actuator 120. The light proceeds along path 144 to SLM 122. SLM 122 directs the light along path 146 back towards actuator 120. The light then proceeds from the actuator 120 to projection optics 124 along path 140. Actuator 120 may enhance the resolution of the projector by laterally shifting light that passes through it. Actuator 120 may perform extended pixel resolution (XPR) actuation in one example. Actuator 120 may be absent in other examples. SLM 122 may be a DMD, an LCOS device, an FLCOS device, an LCDs, or any other SLM. SLM 122 modulates the intensity of the light projected on the display by manipulating the light to form the pixels of the image.

Actuator 120 directs the light along path 140 toward projection optics 124. Projection optics 124 may include any number of lenses in examples herein. Projection optics 124 direct the light along path 142 towards a projection surface (not shown in FIG. 1). Projection system 100 includes non-telecentric prism-less optics. Illumination optics 118 and projection optics 124 are a non-telecentric optical path in an example. Non-telecentric optics allow the examples herein to use fewer illumination lenses and projection lenses than other systems. Non-telecentric optics do not use a prism in these examples, which reduces cost and size of the system. Non-telecentric optics may use a smaller light cone than LED systems, which produces higher etendue and allows for slower F/# optics (which can provide higher contrast) and smaller projection lenses. In some examples, the exit pupil of the illumination should match the entrance pupil of the projection in size and location. Non-telecentric optics may have a finite pupil distance, and light rays may be aimed toward the pupil producing a smaller beam and thus making a smaller lens viable. A smaller light cone reduces the incident angles on the optics, which may improve aberration control and result in fewer optical elements in the system compared to telecentric optics.

The light splitter 104 transmits certain wavelengths of light and reflects certain wavelengths of light, and therefore handles all of the colors of light in the system with one component. In combination with quarter wave plate 108 and the reflective segment 111C of color wheel 110, blue light may be close to 100% efficient along the blue path. A static phosphor may be simple and cheap to implement.

In one example, the blue light from lasers 102 is first light, and the yellow or white light produced by the phosphor 112 is second light. The red light and green light produced by the color wheel 110 are third light and fourth light, respectively.

Figure 2A:
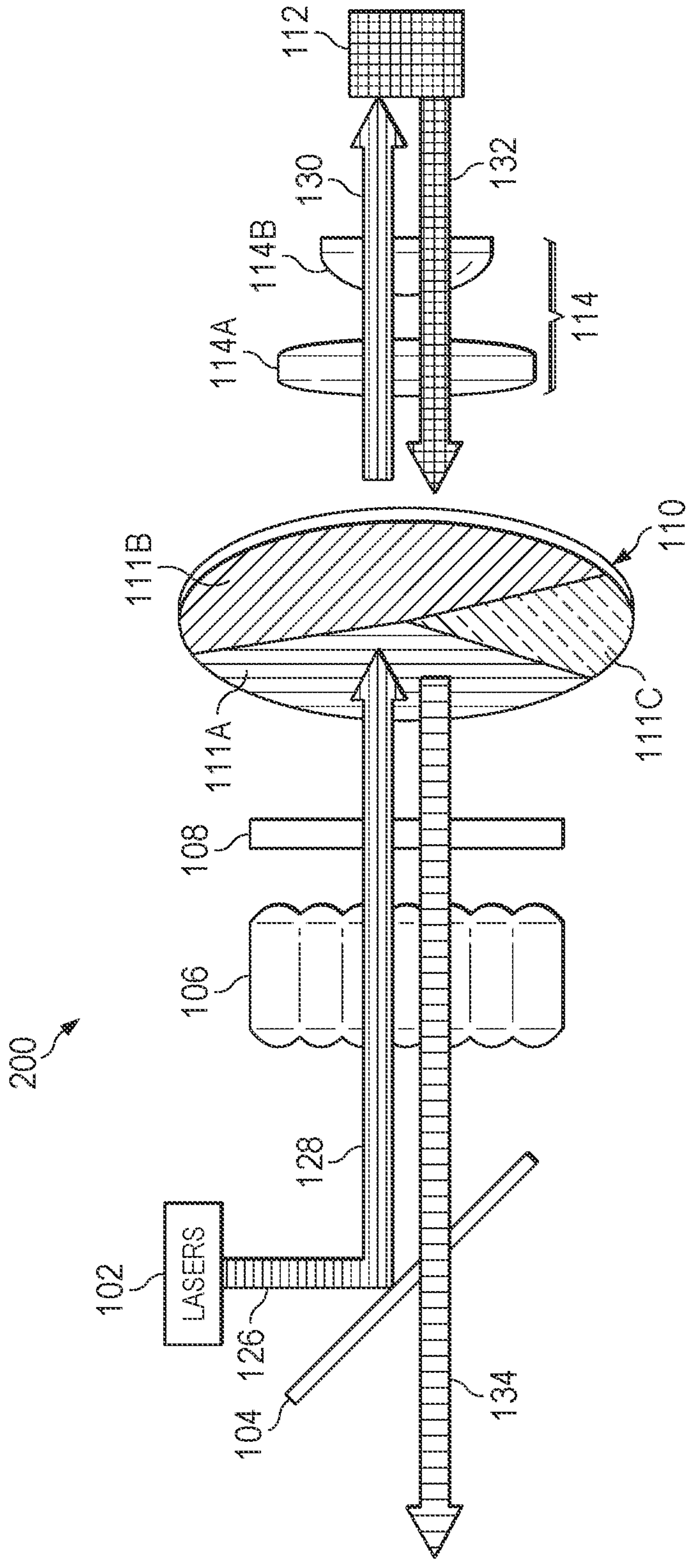
FIGS. 2A, 2B, and 2C are components of a projection system in accordance with various examples.
Figure 2B:
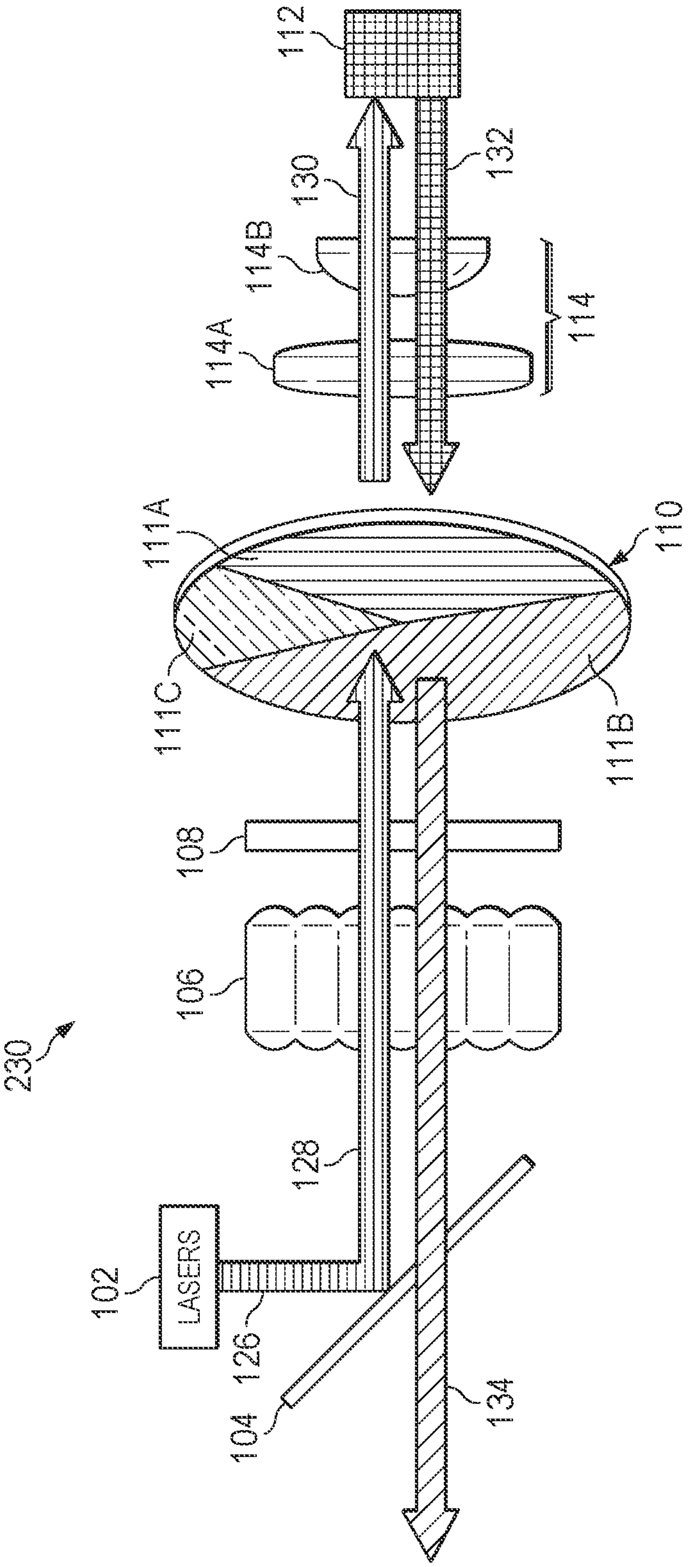
Figure 2C:
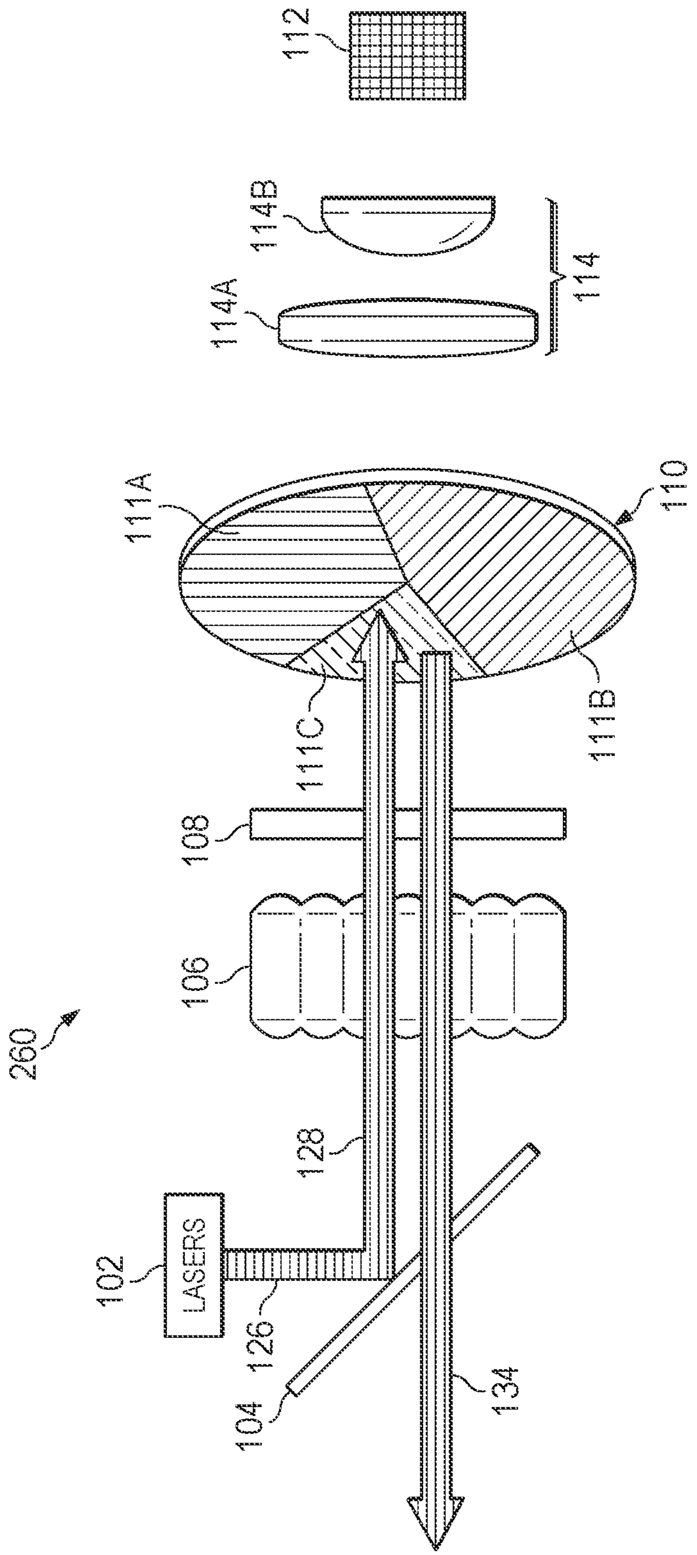

FIGS. 2A, 2B, and 2C are components of a projection system in accordance with various examples herein. FIGS. 2A, 2B, and 2C show how each color (red, green, and blue) is produced by a projection system such as projection system 100. The components shown in FIGS. 2A, 2B, and 2C are described above with respect to FIG. 1, and like numerals denote like components.

FIG. 2A shows a system 200 for producing red light from projection system 100. System 200 includes lasers 102, light splitter 104 (e.g., a dichroic mirror/polarizer), lens array 106, quarter wave plate 108, color wheel 110, phosphor 112, collimators 114, and phosphor 112. Any number of collimators may be present, and two are shown in this example (114A and 114B). Color wheel 110 includes first color segment 111A, second color segment 111B, and reflective segment 111C. Paths 128, 130, 132, and 134 are shown in FIG. 2A.

In system 200, blue light from laser 102 is reflected by light splitter 104 towards lens array 106 along path 128. The blue light having a first polarization passes through lens array 106, which homogenizes the light, and then through quarter wave plate 108, which rotates the polarization of the light 90°. For colors other than blue, the polarization is rotated by quarter wave plate 108, but the polarization of the light does not affect operation. Red or green light is transmitted by light splitter 104 based on their respective wavelengths, so all polarizations of these colors will be transmitted. Blue light is only passed by light splitter 104 after it is rotated twice by quarter wave plate 108; the blue light in path 126 is reflected by light splitter 104. In this example, the blue light passes through first color segment 111A of color wheel 110 after being reflected by light splitter 104. First color segment 111A is a red segment in this example. The blue light travels along path 130 through collimators 114 to phosphor 112. Phosphor 112 is a yellow phosphor in this example. Phosphor 112 converts the blue light to yellow light, and provides the yellow light to color wheel 110 along path 132. The yellow light from phosphor 112 is filtered to produce red light by first color segment 111A, and the red light travels along path 134. The red light passes through quarter wave plate 108, lens array 106, and light splitter 104 towards the other components of projection system 100 (not shown in FIG. 2A).

FIG. 2B shows a system 230 for producing green light from projection system 100. System 230 includes lasers 102, light splitter 104 (e.g., a dichroic mirror/polarizer), lens array 106, quarter wave plate 108, color wheel 110, phosphor 112, collimators 114, and phosphor 112. Any number of collimators may be present, and two are shown in this example (114A and 114B). Color wheel 110 includes first color segment 111A, second color segment 111B, and reflective segment 111C. Paths 128, 130, 132, and 134 are shown in FIG. 2B.

In system 230, blue light from laser 102 from path 126 is reflected by light splitter 104 towards lens array 106 along path 128. The blue light passes through lens array 106, which homogenizes the light, and then through quarter wave plate 108, which rotates the polarization of the light 90°. The blue light passes through second color segment 111B of color wheel 110. The blue light travels along path 130 through collimators 114 to phosphor 112. Phosphor 112 is a yellow phosphor in this example. Phosphor 112 converts the blue light to yellow light, and provides the yellow light to color wheel 110 along path 132. The yellow light from phosphor 112 is filtered to produce green light by green segment 111B, and the green light travels along path 134. The green light passes through quarter wave plate 108, lens array 106, and light splitter 104 towards the other components of projection system 100 (not shown in FIG. 2B).

FIG. 2C shows a system 260 for producing blue light from projection system 100. System 260 includes lasers 102, light splitter 104 (e.g., a dichroic mirror/polarizer), lens array 106, quarter wave plate 108, color wheel 110, phosphor 112, collimators 114, and phosphor 112. Any number of collimators may be present, and two are shown in this example (114A and 114B). Color wheel 110 includes first color segment 111A, second color segment 111B, and reflective segment 111C. Paths 128 and 134 are shown in FIG. 2C.

In system 260, blue light from laser 102 is reflected by light splitter 104 towards lens array 106 along path 128. The blue light passes through lens array 106, which homogenizes the light, and then through quarter wave plate 108, which rotates the polarization of the light 90°. The blue light is then reflected by reflective segment 111C of color wheel 110. The blue light passes through quarter wave plate 108 again, which rotates the polarization of the light another 90°. The blue light is now polarized 180° compared to the blue light directly from laser 102, and the polarized blue light will pass through light splitter 104 along path 134 towards the other components of projection system 100 (not shown in FIG. 2C).

Figure 3:
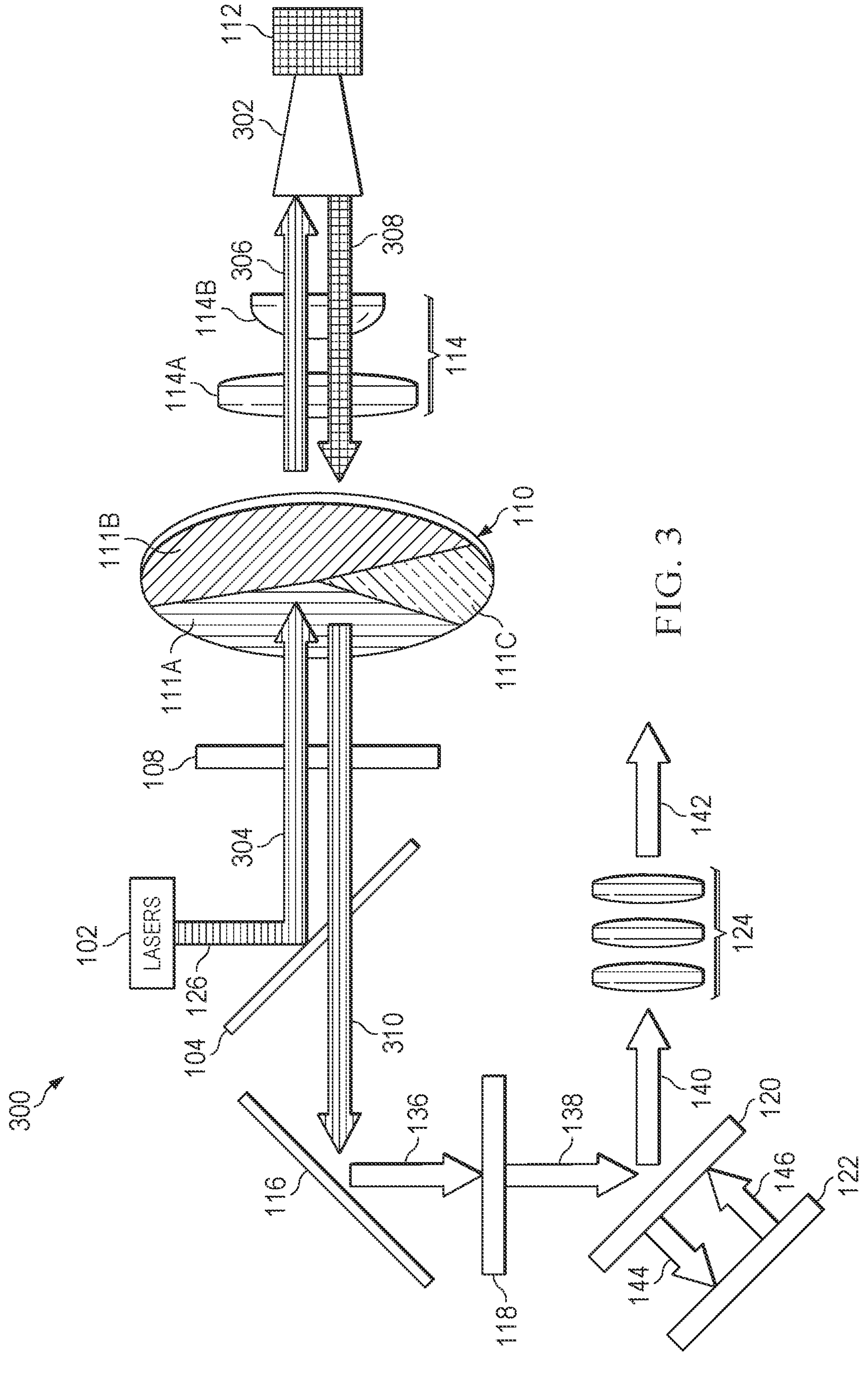
FIG. 3 is a projection system in accordance with various examples.

FIG. 3 is a projection system 300 in accordance with various examples herein. Many of the components in projection system 300 are described above with respect to FIG. 1, and like numerals denote like components. Projection system 300 includes lasers 102, light splitter 104 (e.g., a dichroic mirror/polarizer), quarter wave plate 108, color wheel 110, phosphor 112, and collimators 114. Any number of collimators may be present, and two are shown in this example (114A and 114B). Color wheel 110 includes first color segment 111A, second color segment 111B, and reflective segment 111C in this example. Segments 111A, 111B, and 111C may be any suitable size, and may be different sizes. Projection system 300 also includes mirror 116, illumination optics 118, actuator 120, SLM 122, and projection optics 124. Illumination optics 118 and projection optics 124 may each include any number of lenses in examples herein. Projection system 300 includes various light paths or optical paths, such as paths 126, 136, 138, 140, 142, 304, 306, 308, and 310. Projection system 300 also includes light tunnel 302, which may be referred to as a homogenizing element herein. The components in projection system 300 are not shown to scale in FIG. 3, and may have other configurations in other examples. Some components may be absent in other examples, and components not shown here may be present in other examples.

Projection system 300 is an example projection system that has light tunnel 302 rather than lens array 106 to homogenize the light. The operation of projection system 300 is similar to the operation of projection system 100 described above. In projection system 300, light splitter 104 is positioned to receive laser light from lasers 102 along path 126, which may be blue laser light. Quarter wave plate 108 is situated between light splitter 104 and color wheel 110 along light paths 304 and 310 in this example. Collimators 114 are situated between color wheel 110 and light tunnel 302 in light paths 306 and 308 in this example. Phosphor 112 is situated at the end of light tunnel 302, which may be a tapered light tunnel. Light tunnel 302 may be made of glass plates or be a solid glass rod or tunnel. Light tunnel 302 may be plastic in other examples. Phosphor 112 may be located inside light tunnel 302 in an example. A phosphor 112 inside light tunnel 302 may provide better coupling efficiency than a phosphor 112 situated outside light tunnel 302. In other examples, light tunnel 302 may be a reflective hollow tunnel, a solid rod, a compound parabolic concentrator/collector (CPC), or a curved reflector. Mirror 116 is positioned to receive light transmitted through light splitter 104 and reflect that light towards illumination optics 118. The light is then received at actuator 120 and SLM 122. SLM 122 projects the image to be displayed through projection optics 124. In other examples, the angles and positioning of components such as light splitter 104, mirror 116, and SLM 122 may be different than that shown in FIG. 3.

Projection system 300 includes components configured to provide blue laser light to a yellow phosphor 112 to produce yellow light. The color wheel 110 produces red or green light from yellow light that is produced by phosphor 112. Color wheel 110 reflects blue light. Mirror 116 and illumination optics 118 provide the red, green, or blue light to SLM 122. SLM 122 produces an image and provides the image to projection optics 124 for projection onto a screen or display.

The variations described above with respect to projection system 100 may be useful in projection system 300 as well. For example, the segments 111A, 111B, and 111C in color wheel 110 may be any size. Color wheel 110 may have multiple segments of each color. As an example, each segment 111A, 111B, and 111C could be split into two non-contiguous segments of color wheel 110 (e.g., color wheel 110 could have six segments, two for red, two for green, and two reflective).

Some examples herein may have a white phosphor rather than a yellow phosphor. With a white phosphor, color wheel 110 has a first color segment 111A, a second color segment 111B, and a third color segment 111C (not shown in FIG. 3). Color wheel 110 receives the white light from the white phosphor and filters the white light to produce red, green, or blue light with the appropriate segment of color wheel 110 (or other suitable colors).

In some examples, the reflective segment 111C of color wheel 110 may have a diffuser mounted to it. The diffuser spreads the laser light and produces more uniform and homogenized light to illuminate the SLM 122.

Figure 4:
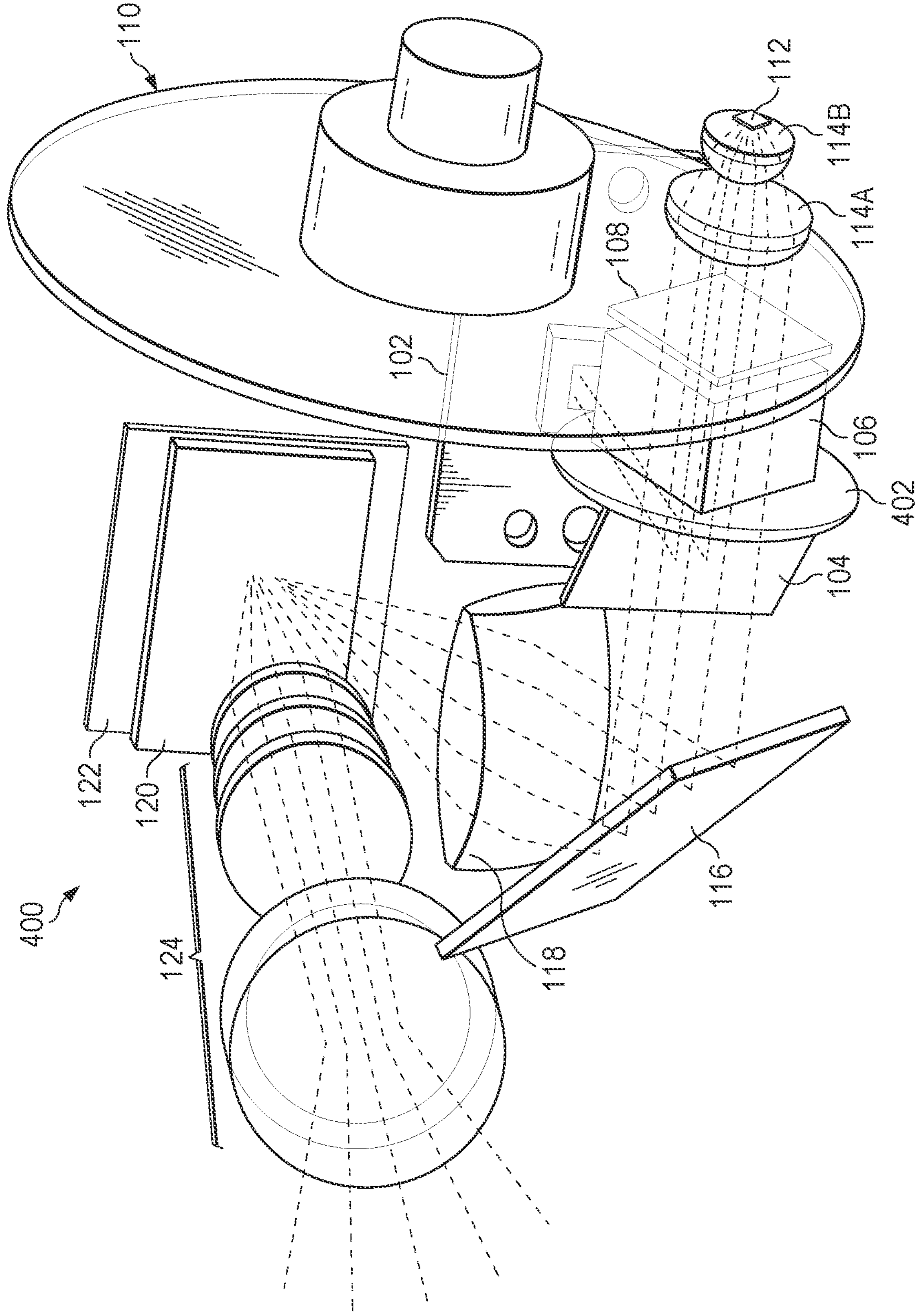
FIG. 4 is a projection system in accordance with various examples.

FIG. 4 is a projection system 400 in accordance with various examples herein. Projection system 400 is a three-dimensional depiction of projection system 100 described above with respect to FIG. 1. Many of the components in projection system 400 are described above with respect to FIG. 1, and like numerals denote like components. Projection system 400 includes lasers 102, light splitter 104, lens array 106, quarter wave plate 108, color wheel 110, phosphor 112, and collimators 114. Any number of collimators may be present, and two are shown in this example (114A and 114B). Projection system 400 also includes mirror 116, illumination optics 118, actuator 120, SLM 122, and projection optics 124. Projection system 400 also includes aperture 402 in this example, situated between light splitter 104 and lens array 106. Aperture 402 masks out any stray light exiting the lens array 106. Lens array 106 may be a fly's eye array in one example.

Projection system 400 operates similarly to projection system 100 described above. FIG. 4 shows one example configuration of the components of projection system 400. This configuration allows for the components to be placed within a 50 mm×50 mm×50 mm space in one example. This size allows the projection system to be incorporated into a small package or to be embedded into another product, such as a handset or laptop. SLM 122 may be a 0.23" DMD in one example. A bottom illuminated DMD is useful in one example, but other configurations may have a corner illuminated DMD. In other examples, the location, size, or orientation of components such as lasers 102, light splitter 104, color wheel 110, mirror 116, illumination optics 118, actuator 120, SLM 122, or projection optics 124 may be different than the configuration shown in FIG. 4.

Projection system 400 has a yellow phosphor 112, but a white phosphor may be useful in other examples. The segments of color wheel 110 may be configured as described above relative to the different types of phosphor. A phosphor wheel may be useful in some examples.

Figure 5:
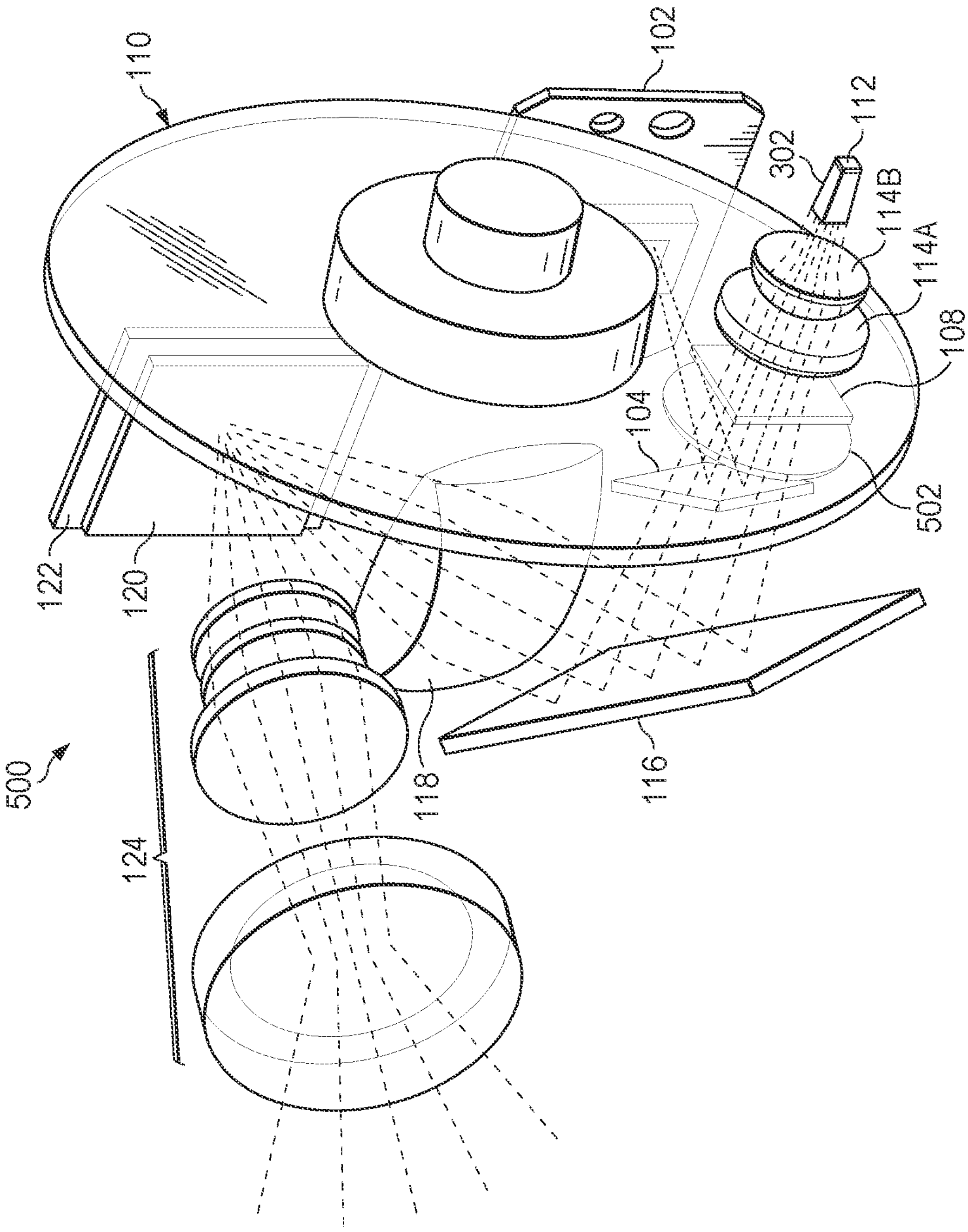
FIG. 5 is a projection system in accordance with various examples.

FIG. 5 is a projection system 500 in accordance with various examples herein. Projection system 500 is a three-dimensional depiction of projection system 300 described above with respect to FIG. 3. Many of the components in projection system 500 are described above with respect to FIG. 3, and like numerals denote like components. Projection system 500 includes lasers 102, light splitter 104, quarter wave plate 108, color wheel 110, phosphor 112, collimators 114, and light tunnel 302. Any number of collimators may be present, and two are shown in this example (114A and 114B). Projection system 400 also includes mirror 116, illumination optics 118, actuator 120, SLM 122, and projection optics 124. Projection system 500 also includes aperture 502 in this example, situated between light splitter 104 and quarter wave plate 108. Aperture 502 masks out stray light exiting light splitter 104.

Projection system 500 operates similarly to projection system 300 described above. FIG. 5 shows one example configuration of the components of projection system 500. This configuration allows for the components to be placed within a 50 mm×50 mm×50 mm space in one example. SLM 122 may be a 0.23" DMD in one example. A bottom illuminated DMD is useful in one example, but other configurations may have a corner illuminated DMD. In other examples, the location, size, or orientation of components such as lasers 102, light splitter 104, color wheel 110, mirror 116, illumination optics 118, actuator 120, SLM 122, or projection optics 124 may be different than the configuration shown in FIG. 5. Projection system 500 has a yellow phosphor 112, but a white phosphor may be useful in other examples. The segments of color wheel 110 may be configured as described above relative to the different types of phosphor.

Figure 6:
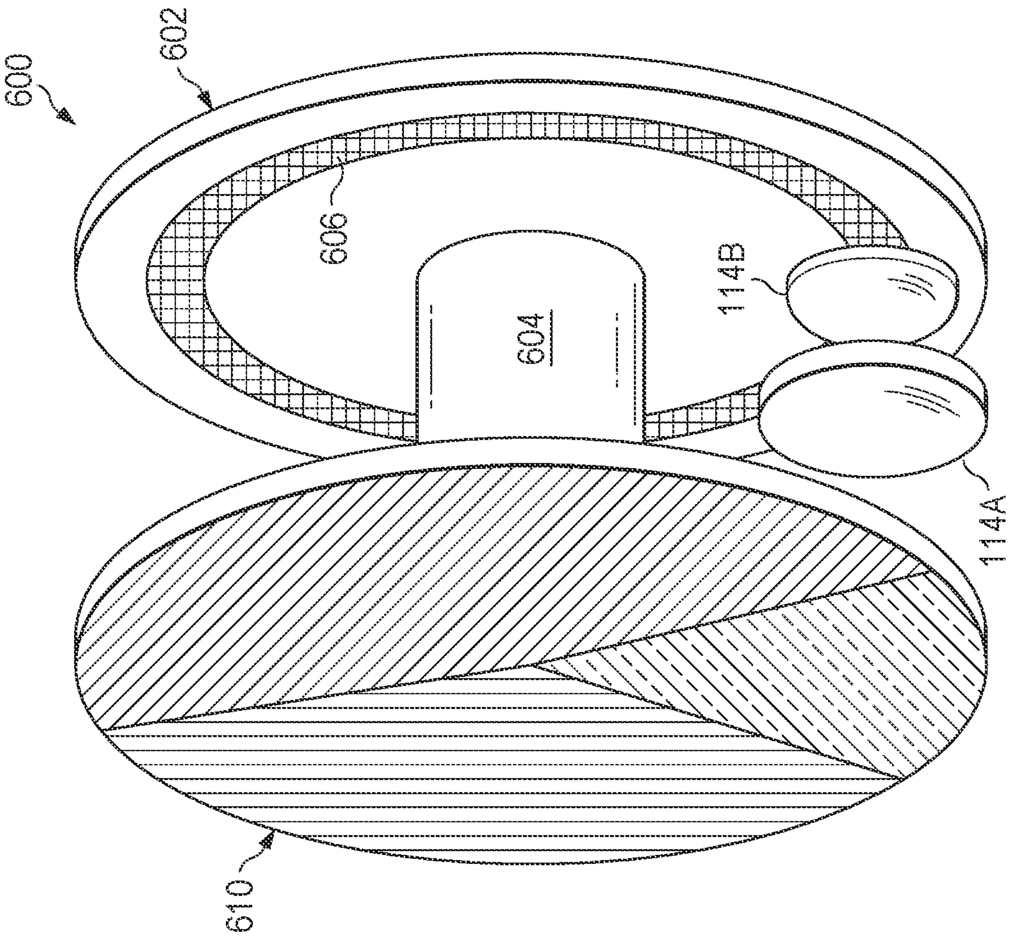
FIG. 6 is a color wheel and phosphor wheel system in accordance with various examples.

FIG. 6 is a color wheel and phosphor wheel system 600 in accordance with various examples herein. System 600 includes a color wheel 610, a phosphor wheel 602, and a motor 604. Phosphor wheel 602 includes a continuous yellow segment 606. System 600 also includes collimators 114A and 114B, situated between color wheel 610 and phosphor wheel 602. Color wheel 610 may be similar to color wheel 110 in some examples.

In system 600, color wheel 610 and phosphor wheel 602 share a single motor 604. Therefore, color wheel 610 and phosphor wheel 602 may rotate together in this example. A single motor 604 may reduce size, weight, and cost compared to separate motors for color wheel 610 and phosphor wheel 602. A single motor also assures wheel synchronization between the color wheel 610 and phosphor wheel 602, so additional synchronization is not performed in an example. Phosphor wheel 602 rotates with color wheel 610 because they share a single motor. Rotating the phosphor wheel 602 as the color wheel 610 rotates also provides cooling of the phosphor due to the spinning motion. In this example, the phosphor on phosphor wheel 602 is a continuous loop on phosphor wheel 602. Incoming light from the other components in the projection system, such as projection system 100, is focused on the continuous loop of the phosphor wheel 602, where the incoming light is converted to yellow light. In other examples, the phosphor on phosphor wheel 602 may have a different configuration, such as a discontinuous loop.

Figure 7:
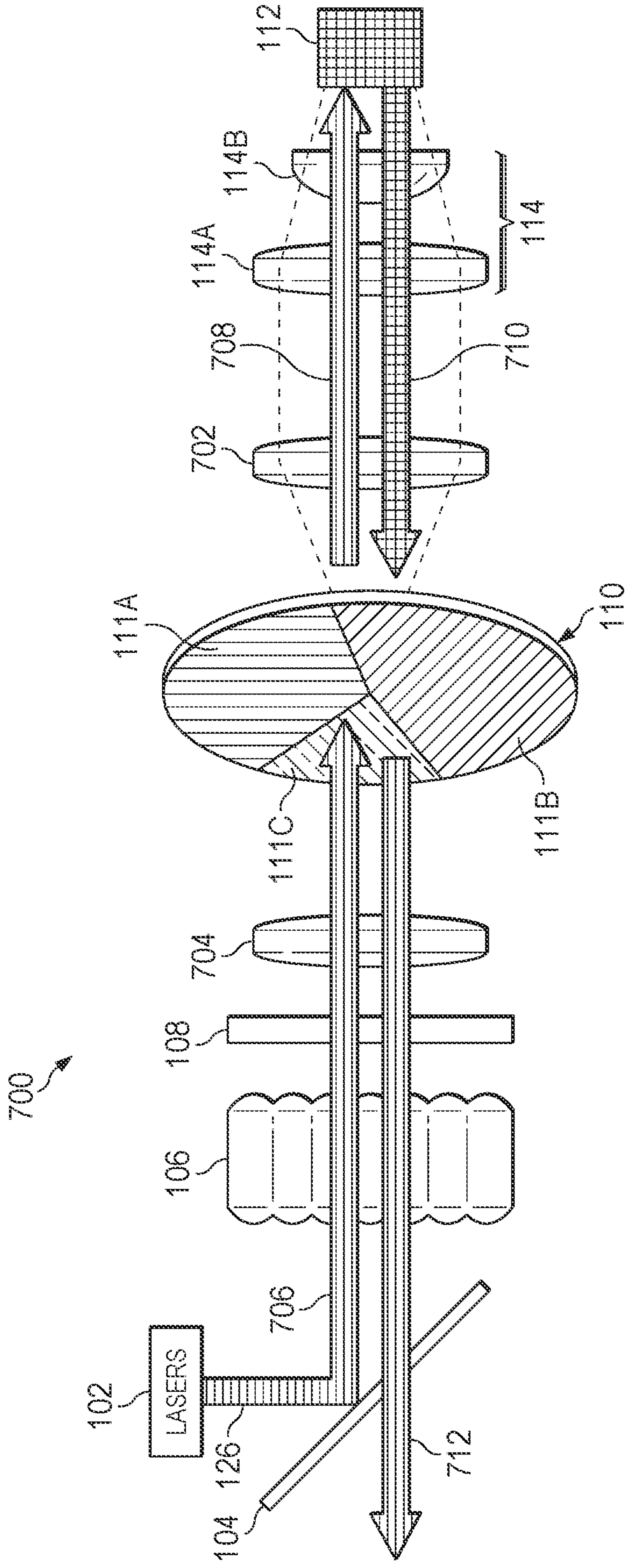
FIG. 7 shows components of a projection system in accordance with various examples.

FIG. 7 shows components of a projection system 700 in accordance with various examples herein. Many of the components in projection system 700 are described above with respect to FIG. 1, and like numerals denote like components. Projection system 700 includes lasers 102, light splitter 104, lens array 106, quarter wave plate 108, color wheel 110, phosphor 112, and collimators 114. Any number of collimators may be present, and two are shown in this example (114A and 114B). Projection system 100 includes paths 126, 706, 708, 710, and 712. Projection system 700 also includes condenser lens 702 in this example, situated between color wheel 110 and collimators 114. Projection system 700 includes collimator 704, situated between quarter wave plate 108 and color wheel 110. Lens array 106 may be a fly's eye array in one example. Phosphor 112 may be a static phosphor or a phosphor wheel in this example.

Projection system 700 operates similarly to projection system 100 described above. Light travels along the paths shown in projection system 700 (e.g., paths 126, 706, 708, 710, and 712). However, in this example, condenser lens 702 creates an image of the phosphor spot onto the color wheel 110. Condenser lens 702 receives divergent light from phosphor 112 and creates a converging beam that converges onto color wheel 110. Therefore, the condenser lens 702 reduces the spot size on color wheel 110, which allows for a smaller color wheel 110 while maintaining a useful spoke size. A smaller color wheel 110 may reduce cost in some examples. Spoke refers to the color segment transition period across the light beam as the color wheel 110 spins. In some examples, the SLM 122 is turned off during these color segment transitions, otherwise the projection system may produce overlapping colors (such as red plus green, for example) which diminishes the color performance of the projection system. The light from phosphor 112 and condenser lens 702 focuses to the image plane at the color wheel 110 and then diverges. Collimator 704 receives this diverging light from color wheel 110 and directs the light towards the lens array 106. Collimator 704 narrows the beam of light to help focus the light onto lens array 106.

In other examples, phosphor 112 could be located within light tunnel 302 (not shown in FIG. 7). Condenser lens 702 creates an image of the output of the light tunnel 302 at the image plane where color wheel 110 is located.

Figure 8:
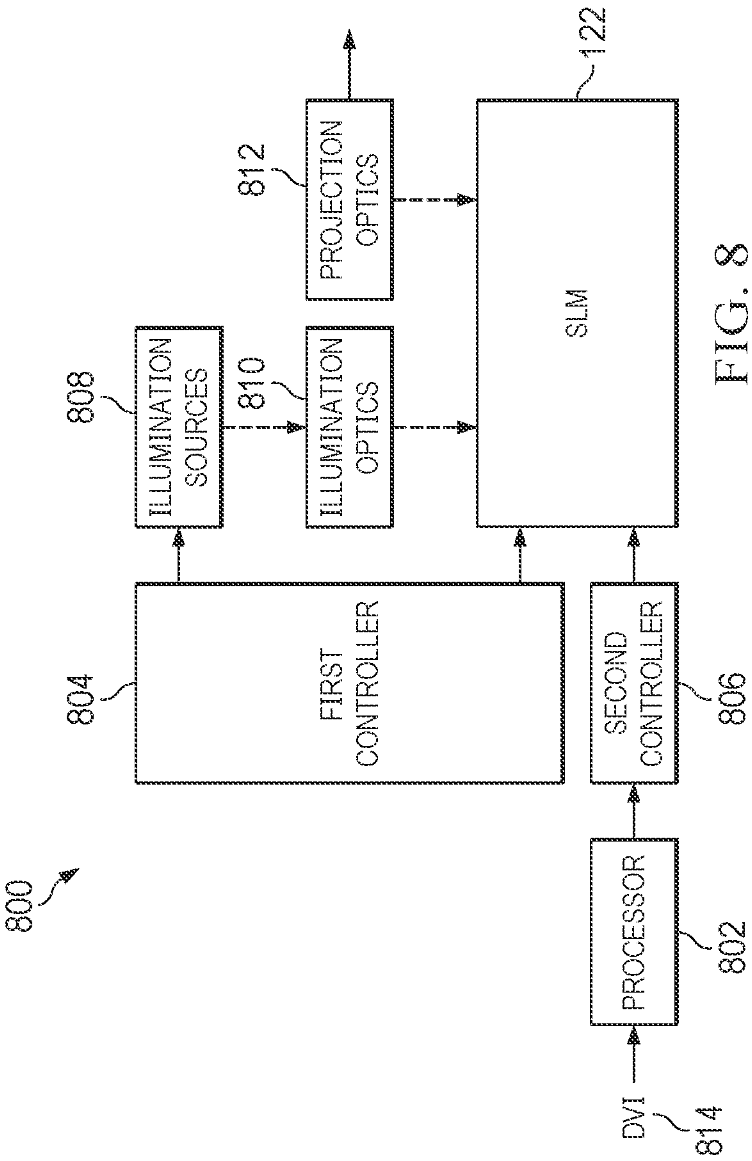
FIG. 8 is a block diagram of a system for controlling an optical projection system in accordance with various examples.

FIG. 8 is a block diagram of a system 800 for controlling the optical projection systems described above. System 800 includes a processor 802, first controller 804, second controller 806, illumination sources 808, illumination optics 810, projection optics 812, digital video input (DVI) 814, and SLM 122.

In operation, processor 802 is a microprocessor, mixed signal processor, digital signal processor (DSP), microcontroller unit (MCU) or other processor that executes instructions that cause processor 802 to output digital video signals for display. A variety of sources may provide the digital video signals at DVI 814, such as Internet browsers, stored files in video cards, flash cards, universal serial bus (USB) drives, solid state drives (SSDs), cameras, personal computers, game consoles, smartphones, camcorders, etc. The processor 802 is coupled to second controller 806. Second controller 806 may be a digital SLM controller integrated circuit (IC), which is a digital video processing integrated circuit. First controller 804 controls intensity and power of the illumination sources 808 in this example. Illumination sources 808 may be lasers 102 in one example. Second controller 806 provides digital data to the SLM 122 for modulating the illumination light that strikes the reflective surface of SLM 122. First controller 804 provides power and analog signals to SLM 122. The light rays from illumination sources 808 are provided to the illumination optics 810 (e.g., illumination optics 118). The colored light rays strike the surface of SLM 122. The reflected modulated light for projection leaves the surface of SLM 122 and travels into the projection optics 812 as described above, where projection optics 812 are projection optics 124 in one example. Therefore, ICs such as first controller 804 and second controller 806 operate with the SLM 122 and the optical components to project images.

In other examples, there may be only one controller in system 800, or there may be more than two controllers. As one example, one controller may control both the illumination sources 808 and the SLM 122. In another example, one controller may control the illumination sources 808 and two controllers may control the SLM 122.

Figure 9:
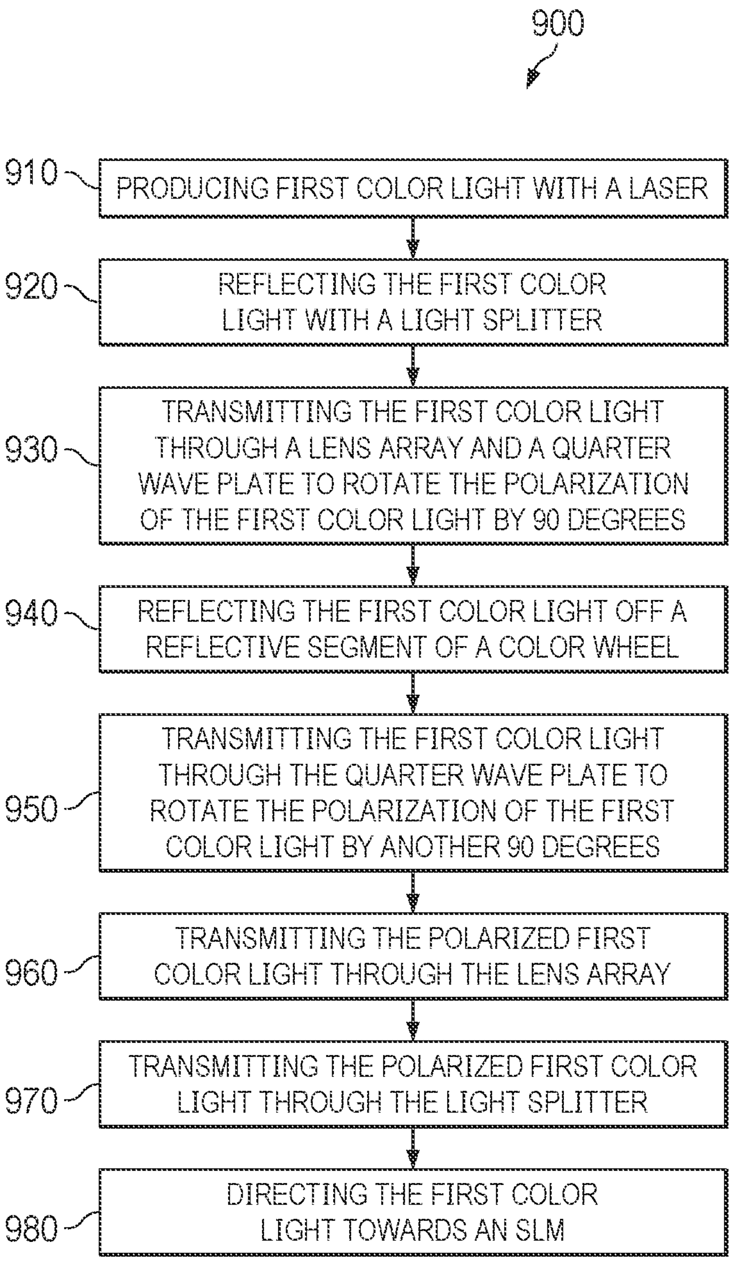
FIG. 9 is a flow diagram of a method for projecting an image in accordance with various examples herein.

FIG. 9 is a flow diagram of a method 900 for projecting an image in accordance with various examples herein. The steps of method 900 may be performed in any suitable order. The hardware components described above with respect to FIGS. 1, 4, and 8 may perform method 900 in some examples. Any suitable hardware, software, or digital logic may perform method 900 in some examples. Method 900 describes how blue light is created and transmitted towards an SLM in one example.

Method 900 begins at 910, where a laser or lasers 102 produce a first color light. The first color light may be blue light in one example. The first color light from the lasers 102 is directed towards a light splitter 104.

Method 900 continues at 920, where a light splitter 104 reflects the first color light. The light splitter 104 may be a dichroic that is configured to reflect the first color light but transmit other wavelengths of light. The light splitter 104 may also be a polarizer that transmits a certain polarization of first color light. As described above, a light splitter 104 in one example reflects blue light from the lasers 102, and then transmits the blue light after the blue light has been polarized by quarter wave plate 108. The light splitter 104 is also configured to transmit all other wavelengths of light, such as red or green light as described above.

Method 900 continues at 930, where the first color light reflected by light splitter 104 is transmitted through a lens array 106 and a quarter wave plate 108. Lens array 106 may be a fly's eye array in one example. Lens array 106 is configured to homogenize the first color light. Quarter wave plate 108 rotates the polarization of the first color light by 90 degrees. In another example, a light tunnel (such as light tunnel 302) homogenized the light and lens array 106 is not present.

Method 900 continues at 940, where the first color light is reflected off of a reflective segment of a color wheel 110. The color wheel 110 may have multiple segments as described herein to produce different colors, and may have multiple reflective segments in some examples. The segments may be of any size and orientation.

Method 900 continues at 950, where the reflected first color light is transmitted through the quarter wave plate 108 to rotate the polarization of the first color light by another 90 degrees. The first color light is now rotated 180 degrees compared to the light produced by lasers 102.

Method 900 continues at 960, where the polarized first color light is transmitted again through the lens array 106. Lens array 106 may again homogenize the first color light.

Method 900 continues at 970, where the polarized first color light is transmitted through light splitter 104. Light splitter 104 is configured to reflect the first color light from lasers 102, but transmit the first color light after the first color light has been twice polarization rotated by quarter wave plate 108.

Method 900 continues at 980, where the first color light is directed towards an SLM, such as SLM 122. The first color light may be transmitted or reflected via various mirrors, lenses, or illumination optics between light splitter 104 and SLM 122. After the first color light reaches SLM 122, SLM 122 may direct the light towards various projection optics for projection of the image. In this example, a prism is absent, which reduces the cost and the size of the projection system.

Figure 10:
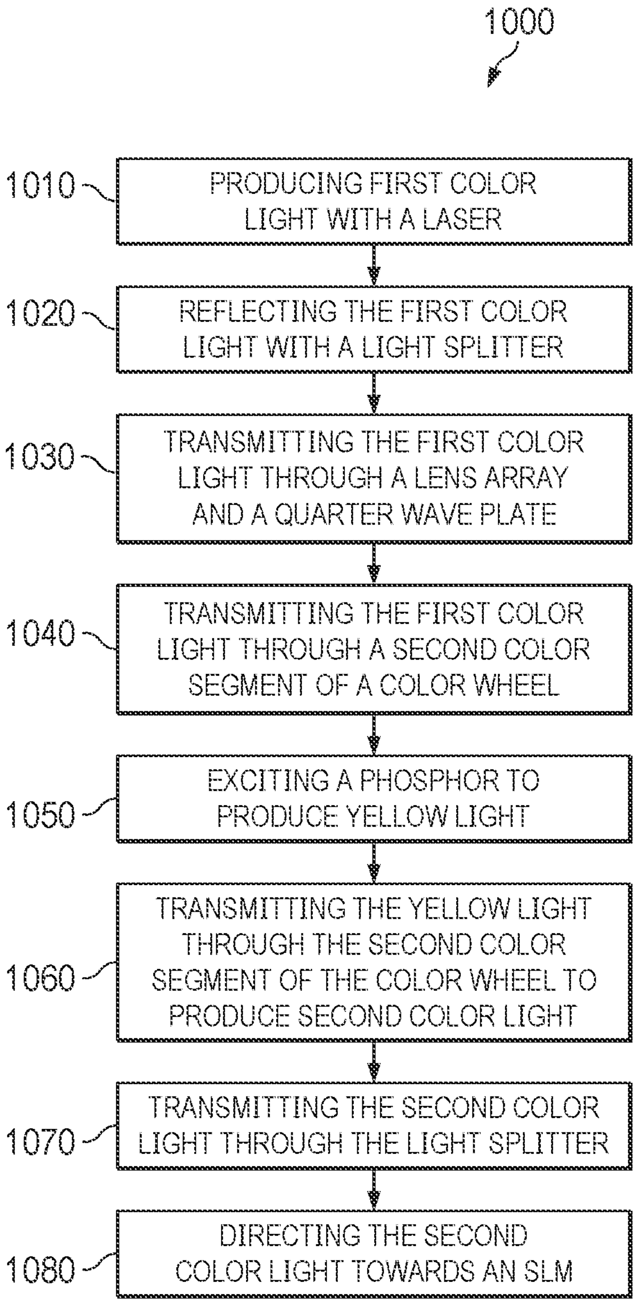
FIG. 10 is a flow diagram of a method for projecting an image in accordance with various examples herein.

FIG. 10 is a flow diagram of a method 1000 for projecting an image in accordance with various examples herein. The steps of method 1000 may be performed in any suitable order. The hardware components described above with respect to FIGS. 1, 4, and 8 may perform method 1000 in some examples. Any suitable hardware, software, or digital logic may perform method 1000 in some examples. Method 1000 describes how a second color light is created and projected towards an SLM in one example. The second color light may be red light, green light, or another color of light. Any other color of light may also be created and projected using the steps of method 1000, by using the appropriate segment of the color wheel as described below.

Method 1000 begins at 1010, where a laser or lasers 102 produce a first color light. The first color light from the lasers 102 is directed towards a light splitter 104. The first color light may be blue light in one example.

Method 1000 continues at 1020, where a light splitter 104 reflects the first color light. The light splitter 104 may be a dichroic that is configured to reflect the first color light but transmit other wavelengths of light. The light splitter 104 may also be a polarizer that transmits a certain polarization of the first color light.

Method 1000 continues at 1030, where the first color light reflected by light splitter 104 is transmitted through a lens array 106 and a quarter wave plate 108. Lens array 106 may be a fly's eye array in one example. Lens array 106 is configured to homogenize the first color light. Quarter wave plate 108 rotates the polarization of the first color light by 90 degrees.

Method 1000 continues at 1040, where the first color light is transmitted through the second color segment of the color wheel 110. After passing through the second color segment of the color wheel 110, the light may pass through collimators 114. The second color may be red, green, or any other color.

Method 1000 continues at 1050, where the light excites a yellow phosphor 112 to produce yellow light. In other examples, the phosphor 112 may be a white phosphor that produces white light. The yellow light produced by the yellow phosphor 112 is transmitted back towards color wheel 110.

Method 1000 continues at 1060, where the yellow light from yellow phosphor 112 is transmitted through the second color segment of the color wheel 110 to produce second color light. The second color light passes through quarter wave plate 108 and lens array 106 for a second time after passing through color wheel 110.

Method 1000 continues at 1070, where the second color light is transmitted through light splitter 104. Light splitter 104 is configured to transmit light at the wavelength of the second color light.

Method 1000 continues at 1080, where the second color light is directed towards an SLM, such as SLM 122. The second color light may be transmitted or reflected via various mirrors, lenses, or illumination optics between light splitter 104 and SLM 122. After the second color light reaches SLM 122, SLM 122 may direct the light towards various projection optics for projection of the image.

Figure 11:
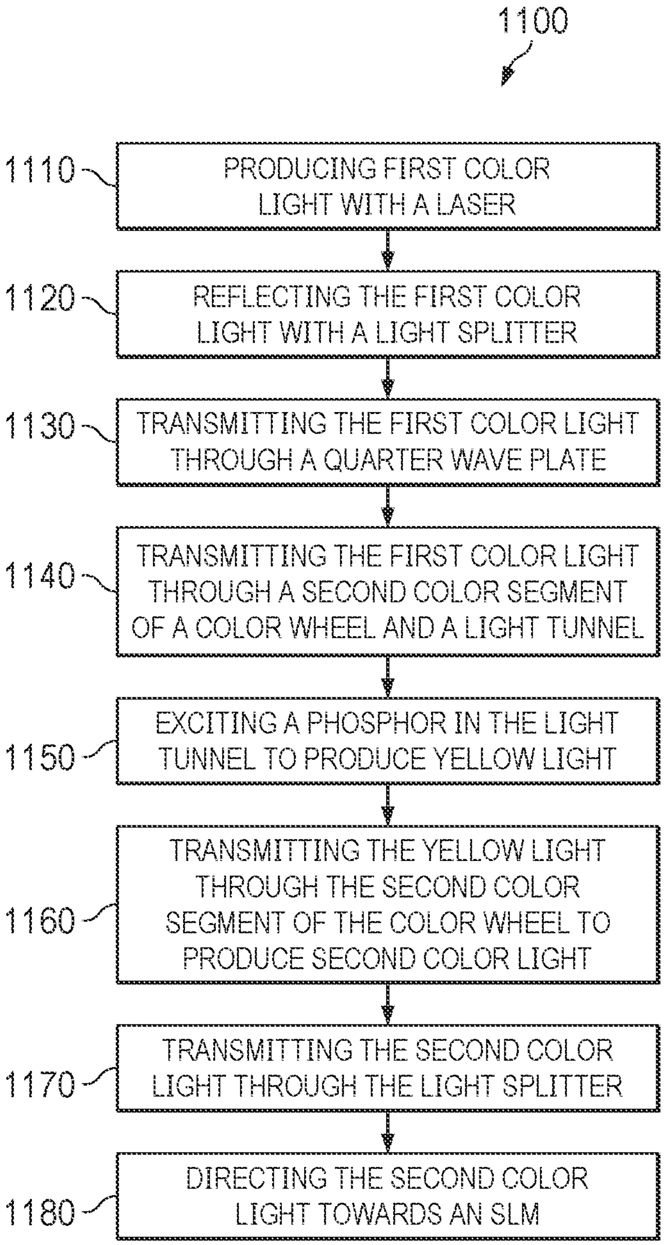
FIG. 11 is a flow diagram of a method for projecting an image in accordance with various examples herein.

FIG. 11 is a flow diagram of a method 1100 for projecting an image in accordance with various examples herein. The steps of method 1100 may be performed in any suitable order. The hardware components described above with respect to FIGS. 3, 5, and 8 may perform method 1100 in some examples. Any suitable hardware, software, or digital logic may perform method 1100 in some examples. Method 1100 describes how a second color light is created and projected towards an SLM in one example with a light tunnel 302 that contains phosphor 112. The second color light may be red light, green light, or another color of light. Any other color of light may also be created and projected using the steps of method 1100, by using the appropriate segment of the color wheel as described below.

Method 1100 begins at 1110, where a laser or lasers 102 produce first color light. The first color light from the lasers 102 is directed towards a light splitter 104. First color light may be blue light in one example.

Method 1100 continues at 1120, where a light splitter 104 reflects the first color light. The light splitter 104 may be a dichroic that is configured to reflect first color light but transmit other wavelengths of light. The light splitter 104 may also be a polarizer that transmits a certain polarization of the first color light.

Method 1100 continues at 1130, where the first color light reflected by light splitter 104 is transmitted through a quarter wave plate 108. Quarter wave plate 108 rotates the polarization of the first color light by 90 degrees. In some examples, an aperture 502 may reside between light splitter 104 and quarter wave plate 108. Aperture 502 masks out any stray light exiting light splitter 104.

Method 1100 continues at 1140, where the first color light is transmitted through the second color segment of the color wheel 110. After passing through the second color segment of the color wheel 110, the light may pass through collimators 114 and into light tunnel 302.

Method 1100 continues at 1150, where the light excites a yellow phosphor 112 in light tunnel 302 to produce yellow light. Light tunnel 302 may be any suitable type of light tunnel as described above, and is configured to homogenize the light. In other examples, the phosphor 112 may be a white phosphor that produces white light. The yellow light produced by the yellow phosphor 112 is transmitted back towards color wheel 110.

Method 1100 continues at 1160, where the yellow light from yellow phosphor 112 is transmitted through the second color segment of the color wheel 110 to produce second color light. The second color light passes through quarter wave plate 108 and aperture 502 after passing through color wheel 110.

Method 1100 continues at 1170, where the second color light is transmitted through light splitter 104. Light splitter 104 is configured to transmit light at the wavelength of the second color light.

Method 1100 continues at 1180, where the second color light is directed towards an SLM, such as SLM 122. The second color light may be transmitted or reflected via various mirrors, lenses, or illumination optics between light splitter 104 and SLM 122. After the second color light reaches SLM 122, SLM 122 may direct the light towards various projection optics for projection of the image.

In examples herein, projector architecture are described that include a laser phosphor and non-telecentric optics. Non-telecentric optics eliminate the need for a prism and certain expensive projection optics, which reduces the cost of the system. The laser phosphor system may produce 500-1,000 lumens in some examples, providing greater brightness than LED architectures. In one example, a dual-pass lens array 106 homogenizes the light, and a quarter wave plate 108 rotates the polarization of blue light from the lasers 102. The lasers 102 provide blue light, and a phosphor produces white or yellow light, which is converted to red or green light by a color wheel 110. The red, green, and blue light is provided to an SLM 122 and then projected through projection optics 124 to produce an image. In another example, a light tunnel 302 optically coupled to the phosphor 112 homogenizes the light rather than using a lens array 106. The examples herein may include a static phosphor or a moving phosphor wheel. The examples may have a yellow or a white phosphor.

The examples herein provide compact projection systems at reduced cost with high brightness. Common lasers, color wheels, and projection optics may be useful in some examples. The lack of a prism and fewer projection lenses reduces the cost and complexity of the systems described herein. Scalable brightness is attainable by using the same optics but with more or fewer lasers. Some examples have higher contrast capability due to slower F/# optics.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A system, comprising:

a light splitter configured to reflect first light having a first wavelength and a first polarization, to transmit light having the first wavelength and a second polarization, to transmit light having a second wavelength, and to transmit light having a third wavelength;

a quarter wave plate configured to be optically coupled to the light splitter;

a color wheel configured to be optically coupled to the quarter wave plate, the color wheel having a first segment configured to transmit a first color, a second segment configured to transmit a second color, and a reflective segment; and a phosphor wheel configured to be optically coupled to the color wheel and configured to share a motor with the color wheel, the phosphor configured to produce second light responsive to receiving the first light, and the color wheel configured to receive the second light and produce light having the second wavelength or the third wavelength.

2. The system of claim 1, further comprising:

a spatial light modulator configured to be optically coupled to the color wheel; and one or more projection lenses configured to be optically coupled to the spatial light modulator.

3. The system of claim 1, further comprising:

a homogenizing element configured to be optically coupled to the light splitter.

4. The system of claim 3, wherein the homogenizing element is a light tunnel.

5. The system of claim 3, wherein the homogenizing element is a fly's eye array.

6. The system of claim 1, further comprising:

a collimator configured to be optically coupled between the color wheel and the phosphor.

7. The system of claim 1, wherein the first segment is a first filter segment, and the second segment is a second filter segment.

8. The system of claim 1, wherein the phosphor is a yellow phosphor.

9. The system of claim 1, wherein the phosphor is a static phosphor.

10. The system of claim 1, wherein the phosphor is a phosphor wheel, and wherein the color wheel and the phosphor wheel share a motor.

11. A system, comprising:

a light splitter;

a color wheel optically coupled to the light splitter, the color wheel having a first filter segment configured to transmit a first color, a second segment configured to transmit a second color, and a reflective segment;

a homogenizing element optically coupled to the color wheel;

a phosphor optically coupled to the homogenizing element;

a quarter wave plate optically coupled between the light splitter and the color wheel; and a spatial light modulator optically coupled to the light splitter.

12. The system of claim 11, wherein the first segment is a first segment, and the second segment is a second filter segment.

13. The system of claim 11, wherein the light splitter, the color wheel, and the phosphor are in a non-telecentric optical path.

14. The system of claim 11, wherein the phosphor is a static phosphor or a phosphor wheel.

15. The system of claim 11, further comprising:

a condenser lens configured to be optically coupled to the phosphor and the color wheel, the condenser lens configured to condense light onto the color wheel.

16. A system, comprising:

a light splitter configured to receive first light having a first color and to reflect the first light to produce reflected first light;

a homogenizing element configured to be optically coupled to the light splitter and configured to homogenize the reflected first light to produce first homogenized light;

a color wheel configured to be optically coupled to the homogenizing element, the color wheel having a first filter segment configured to reflect the first light and a second filter segment configured to transmit the first light; and a phosphor configured to be optically coupled to the color wheel, the phosphor configured to produce second light responsive to receiving the first light, the second light having a second color, wherein the second filter segment of the color wheel is configured to filter the second light to produce third light having a third color, and the light splitter is configured to transmit the third light having the third color.

17. The system of claim 16, further comprising:

a light emitting device configured to produce the first light having the first color.

18. The system of claim 16, further comprising:

a third filter segment on the color wheel, the third filter segment configured to filter the second light to produce fourth light having a fourth color.

19. The system of claim 16, further comprising:

a spatial light modulator configured to be optically coupled to the phosphor, the spatial light modulator configured to modulate the first light or the third light to produce an image.

20. The system of claim 16, further comprising:

a quarter wave plate configured to be optically coupled between the light splitter and the color wheel and configured to rotate a polarization of the first light and the third light.

* * * * *